(12) United States Patent
Poff

(10) Patent No.: US 7,595,610 B2
(45) Date of Patent: Sep. 29, 2009

(54) REDUNDANT BATTERY PROTECTION SYSTEM AND METHOD

(75) Inventor: Spencer Poff, Aloha, OR (US)

(73) Assignee: MicroPower Electronics Inc., Hillsboro, OR (US)

(*) Notice: Subject to any disclaimer, the term of this patent is extended or adjusted under 35 U.S.C. 154(b) by 232 days.

(21) Appl. No.: 11/563,125

(22) Filed: Nov. 24, 2006

(65) Prior Publication Data
US 2007/0145944 A1 Jun. 28, 2007

Related U.S. Application Data

(60) Provisional application No. 60/739,251, filed on Nov. 23, 2005.

(51) Int. Cl.
*H02J 7/00* (2006.01)
*G01N 27/416* (2006.01)

(52) U.S. Cl. ............... 320/134; 320/136; 320/162; 429/434

(58) Field of Classification Search ............... 320/116, 320/121, 134, 136, 152, 162; 324/426, 434, 324/435
See application file for complete search history.

(56) References Cited

U.S. PATENT DOCUMENTS

| | | | | |
|---|---|---|---|---|
| 5,783,322 A | * | 7/1998 | Nagai et al. | 429/7 |
| 6,051,955 A | * | 4/2000 | Saeki et al. | 320/121 |
| 2002/0006814 A1 | * | 1/2002 | Fukunishi | 455/572 |
| 2002/0121880 A1 | * | 9/2002 | Yamanaka et al. | 320/134 |
| 2005/0231168 A1 | * | 10/2005 | Lin | 320/134 |

* cited by examiner

*Primary Examiner*—Akm E Ullah
*Assistant Examiner*—Johali A Torres Ruiz
(74) *Attorney, Agent, or Firm*—Perkins Coie LLP

(57) ABSTRACT

An enhanced battery pack having an enhanced protection system addresses a potential weakness of the conventional protection system of a conventional battery pack. The enhanced protection system includes both the convention protection circuit and a redundant protection circuit. The redundant protection circuit is either a duplicate copy of the conventional protection circuit or is at least a functional equivalent of the conventional protection circuit. The components of the redundant protection circuit are electrically coupled into the enhanced battery pack in a parallel fashion with the corresponding components of the conventional protection circuit. Consequently, if one or more components of the conventional protection circuit fail due to defective conditions of the one or more components of the conventional protection circuit, the redundant protection circuit will still be operable to allow the enhanced battery pack to function while the enhanced protection system continues to protect the enhanced battery pack.

20 Claims, 4 Drawing Sheets

REDUNDANT BATTERY PROTECTION SYSTEM AND METHOD

BACKGROUND OF THE INVENTION

1. Field of the Invention

The present invention is directed generally to protection systems for battery packs.

2. Description of the Related Art

Battery packs generally have more than one battery cell internally housed in the battery pack such as generally depicted in FIG. 1 for a conventional battery pack 10 using an indefinite number, N, of lithium (Li) ion cells 12 electrically coupled between a first external terminal 14 and a second external terminal 16. As shown, the Li ion cells 12 are arranged in a series configuration, but in other battery packs the Li ion cells could be arranged in a parallel configuration or in a combination of a series configuration and a parallel configuration.

Battery cells, such as the Li ion cells 12 depicted are typically dependable, but on occasion an individual one of the Li ion cells may enter into a state causing such an undesirable internal condition as an overvoltage condition, which could potentially damage one or more other of the Li ion cells in the conventional battery pack or may potentially damage equipment (not shown) electrically coupled to the conventional battery pack 10. At other times, a charger or other external device (not shown) electrically coupled to the conventional battery pack may enter into a state that may result in an undesirable condition that may potentially damage one or more of the Li ion cells 12 of the conventional battery pack if the external device is allowed to remain electrically coupled to the conventional battery pack.

Conventional battery protection systems exist to help protect battery cells from undesirable internal and/or external conditions. For instance, a conventional protection system 18 is shown in FIG. 1 as having a conventional integrated circuit (IC) based battery protection circuit 20, and a conventional transistor pair 22 of a discharge transistor 24, and a charge transistor 26. The conventional protection circuit 20 includes an N cell Li ion battery conventional protection IC 28 and can also include one or more discrete devices 30 such as electrical resistors and/or capacitors and/or other discrete electrical components.

The conventional protection IC 28 is electrically coupled to circuit locations positioned between each of the series connected N number of the Li ion cells 12 for a total of N-1 number of electrical couplings from between a pair of the Li ion cells to the conventional protection IC. The conventional protection IC 28 also is electrically coupled to a circuit location positioned between the number 1 of the Li ion cells and the discharge transistor 24 of the conventional transistor pair 22 as depicted. The conventional protection IC 28 is electrically coupled to a circuit location positioned between the number N of the Li ion cells and the second external terminal 16. Consequently, the conventional protection IC is electrically coupled to either terminal of each of the Li ion cells 12 to allow, among other things, measurements of voltages conditions of each of the Li ion cells by the convention protection IC.

The conventional protection IC 28 is also coupled to the conventional transistor pair 22 of the discharge transistor 24 and the charge transistor 26, which allows, among other things, control of the open and closed circuit states of the conventional transistor pair acting as a switch dependent upon the presence or absence of a first state of the conventional protection IC.

In practice when an undesirable condition occurs, such as an overcharge condition in one of the Li ion cells 12, the conventional protection circuit 20 is in the first state to cause the conventional transistor pair 22 of the discharge transistor 24 and the charge transistor 26 to have an open circuit condition between the number 1 of the Li ion cells and the first external terminal 14 so that electrical current is no longer allowed to flow thereby protecting the Li ion cells and any external devices (not shown) electrically coupled to the conventional battery pack 10.

An implementation of the conventional battery pack 10 is shown in FIG. 2 as having three of the Li ion cells 12. The implementation has a version of the conventional protection system 18 with a version of the conventional protection circuit 20 that has a three-cell version of the conventional protection IC 28 and MOSFET versions of the conventional transistor pair 22 of the discharge transistor 24 and the charge transistor 26. Electrical resistors are used with the version of the conventional protection circuit 20 as the discrete devices 30 to couple the conventional protection IC 28 to circuit locations positioned between pairs of the Li-ion cells and a location between the number 1 of the Li ion cells 12 and the discharge transistor 24 of the conventional transistor pair 22.

Although the conventional protection system 18 gives a level of safety to the conventional battery pack 10, in certain circumstances, the conventional protection system can unfortunately, detract from the overall effectiveness of the conventional battery pack. In particular, if one of the components of the conventional protection system 18 inadvertently fails due to faulty conditions of the component rather than an undesirable internal or external condition described above, the conventional battery pack 10 will be rendered in this situation inoperable even though all of the internal Li ion cells 12 and externally coupled one or more external devices (not shown) are functioning properly. Consequently, the conventional battery pack 10 is disabled by the conventional protection system 18 even though no undesirable condition exists for which that the conventional protection system was designed to disable the conventional battery pack.

BRIEF DESCRIPTION OF THE SEVERAL VIEWS OF THE DRAWING(S)

DETAILED DESCRIPTION OF THE INVENTION

As disclosed herein, an enhanced battery pack having an enhanced protection system addresses a potential weakness of the conventional protection system 18 of the conventional battery pack 10 that solely relies on the conventional protection circuit 20. The conventional protection system 18 can become inoperable due to a faulty condition of one or more components of the conventional protection circuit 20 itself. The enhanced protection system includes both the convention protection circuit 20 and a redundant protection circuit. The redundant protection circuit is either a duplicate copy of the conventional protection circuit 20 or is at least a functional equivalent of the conventional protection circuit. The components of the redundant protection circuit are electrically coupled into the enhanced battery pack in a parallel fashion with the corresponding components of the conventional protection circuit 20.

Consequently, if one or more components of the conventional protection circuit 20 fail due to defective conditions of the one or more components of the conventional protection circuit, the redundant protection circuit will still be operable to allow the enhanced battery pack to function while the enhanced protection system continues to protect the enhanced battery pack. Likewise, if the redundant protection circuit becomes inoperable due to one or more of the components of the redundant protection circuit being faulty, the conventional protection circuit 20 can be used as a backup so that the enhanced battery pack will continue to function while the enhanced protection system continues to protect the enhanced battery pack. Only in the case where both the conventional protection circuit 20 and the redundant protection circuit are inoperable due to one or more faulty components of each of the conventional protection circuit and the redundant protection circuit, will the enhanced battery pack cease to function due to faulty conditions of the conventional protection circuit and the enhanced protection circuit.

On the other hand, when both the conventional protection circuit 20 and the redundant protection circuit are properly functioning, if an undesirable condition should occur either internally to the enhanced battery pack such as an overvoltage condition with one or more of the Li ion cells 12 or externally to the enhanced battery pack such as due to improper charging of the enhanced battery pack by an external charger, both the conventional protection circuit 20 and the redundant protection circuit will cause an open circuit condition within the enhanced battery pack so that current is not allowed to flow from the enhanced battery pack thereby protecting the enhanced battery pack and also external devices electrically coupled to the enhanced battery pack.

Figure 1:
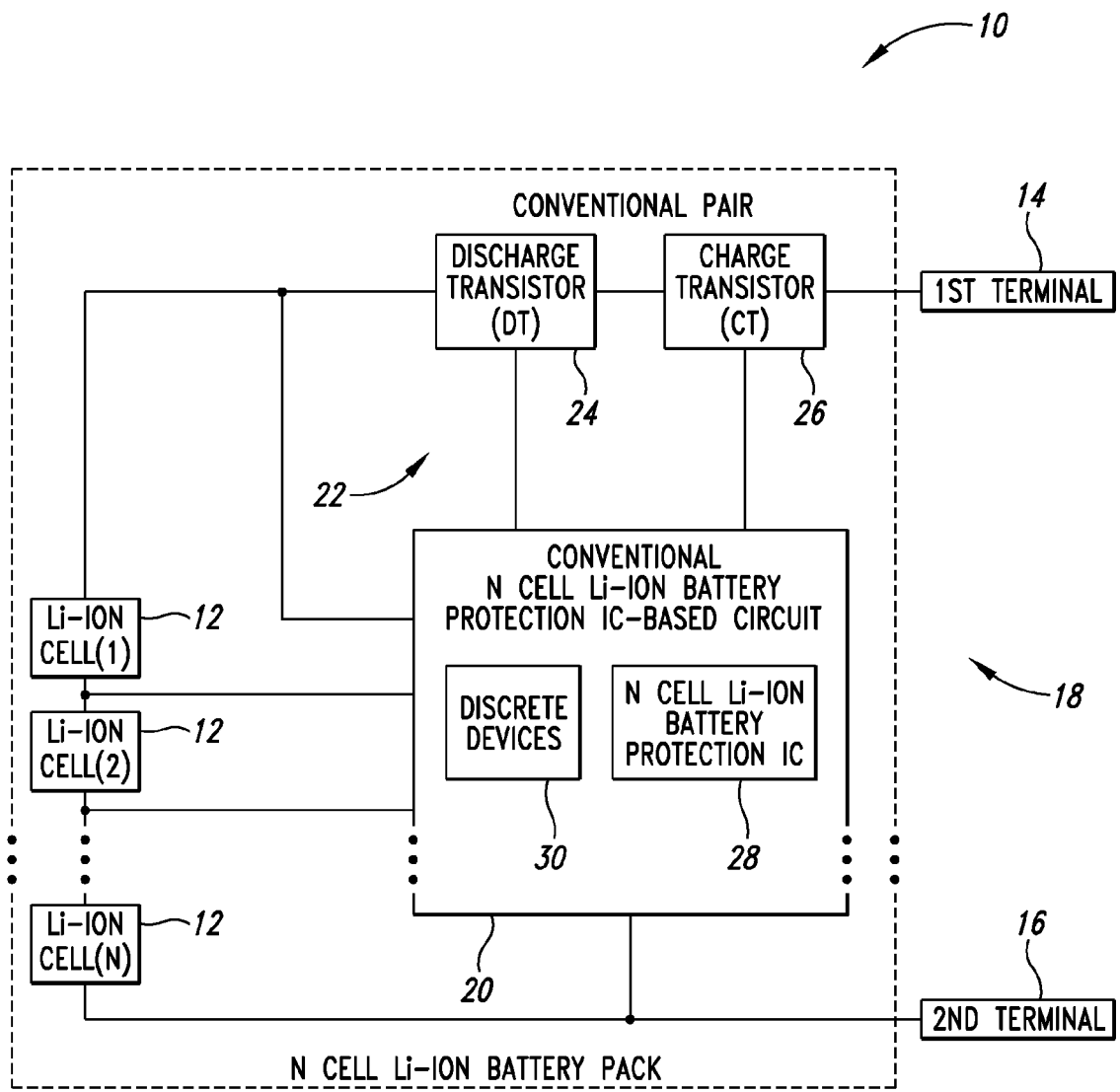
FIG. 1 is a schematic of a generally depicted conventional battery pack having a conventional protection system with a conventional protection circuit.
Figure 2:
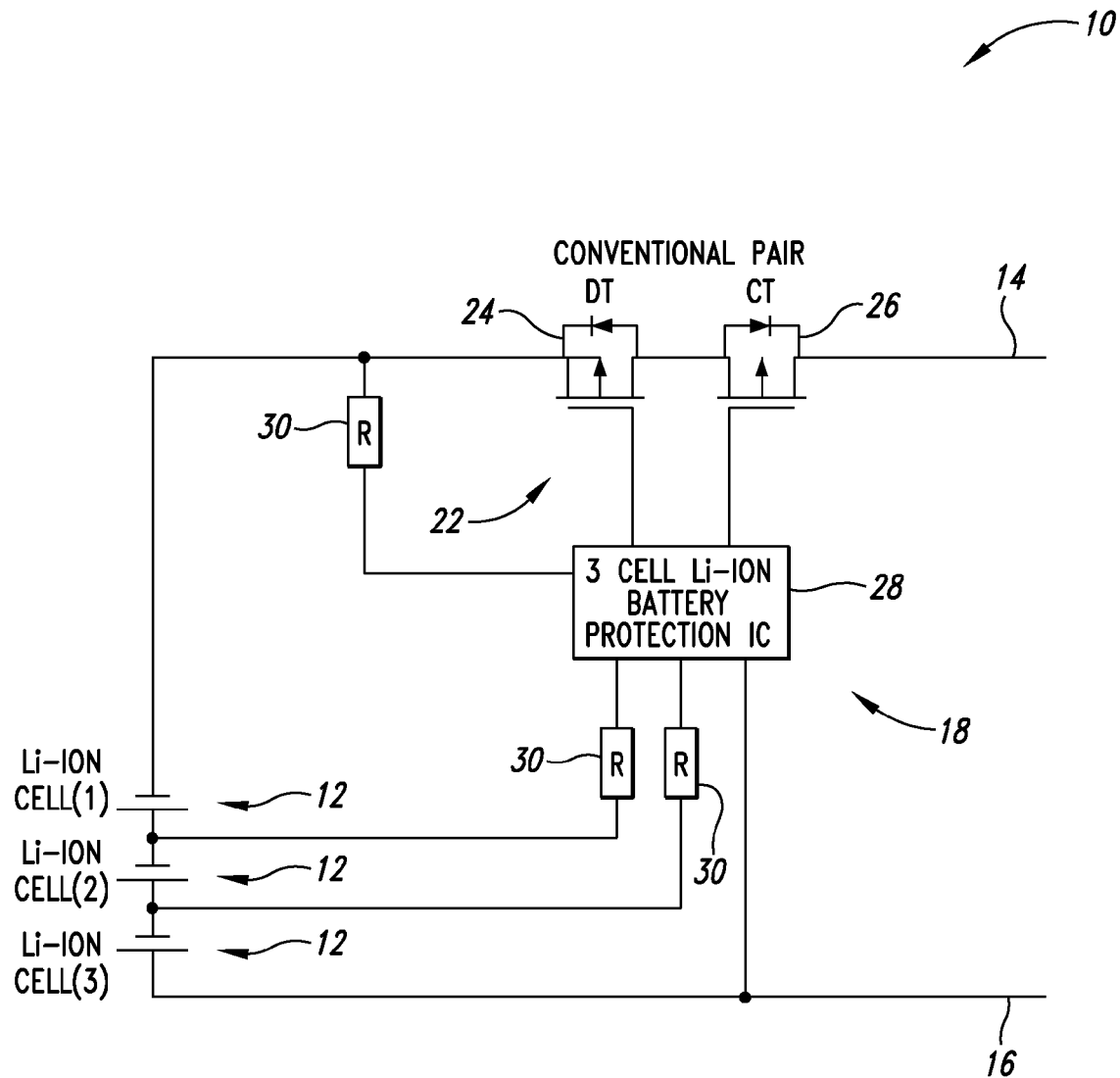
FIG. 2 is a schematic of a three Li ion cell implementation of the generally depicted conventional battery pack of FIG. 1 having a three cell version of the conventional protection circuit.
Figure 3:
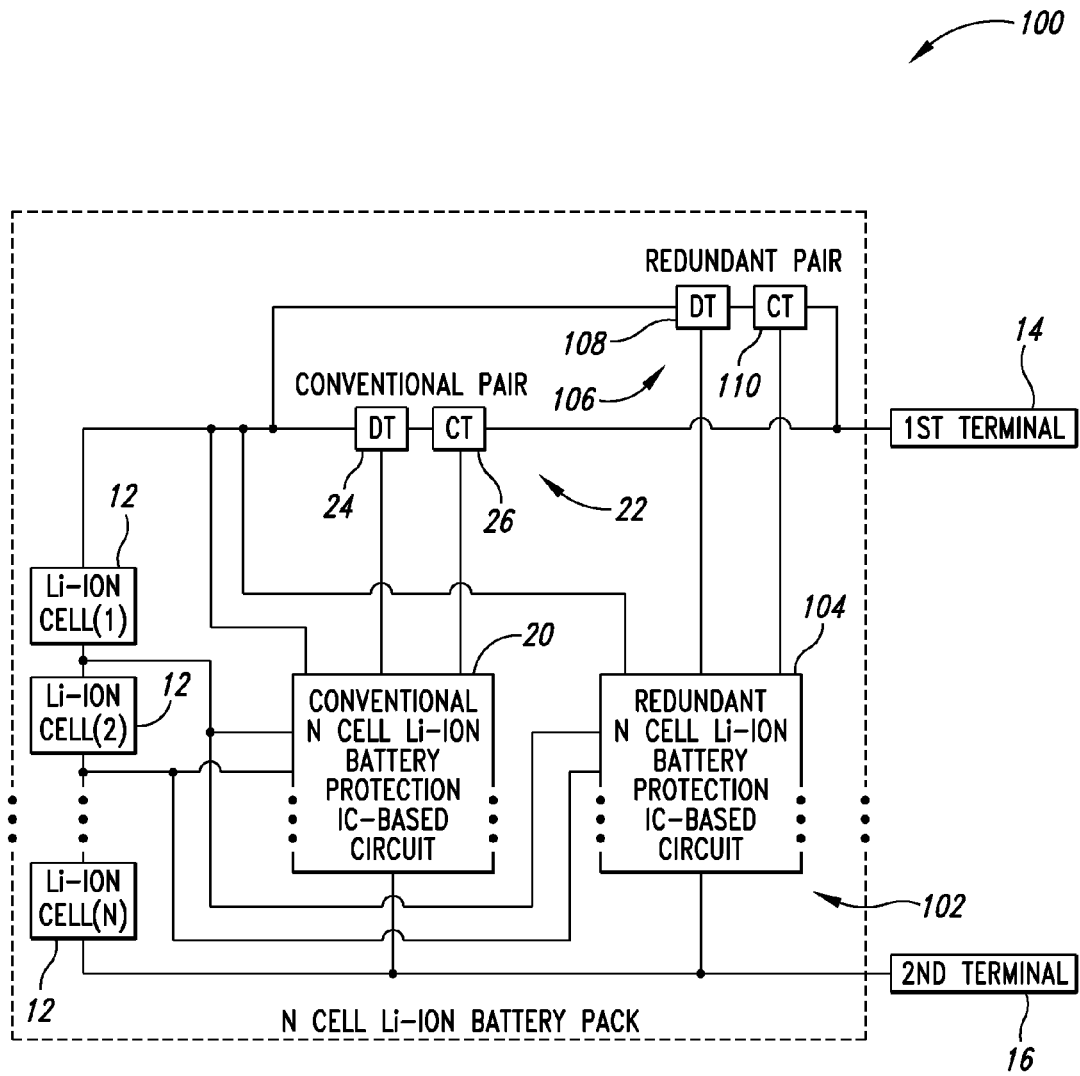
FIG. 3 is a schematic of a generally depicted enhanced battery pack according to the present invention with an enhanced protection system having the conventional protection circuit and a redundant protection circuit electrically coupled in parallel.

Generally depicted, an enhanced battery pack 100 having an enhanced protection system 102 is shown in FIG. 3 having the conventional protection circuit 20 coupled to N number of the Li ion cells 12 and the conventional transistor pair 22 of the discharge transistor 24 and the charge transistor 26 as described above. Furthermore, the enhanced protection system 102 has a redundant protection circuit 104 and a redundant transistor pair 106 of a discharge transistor 108 and a charge transistor 110. The redundant protection circuit 104 is electrically coupled into the enhanced battery pack 100 in parallel with the conventional protection circuit 20.

Figure 4:
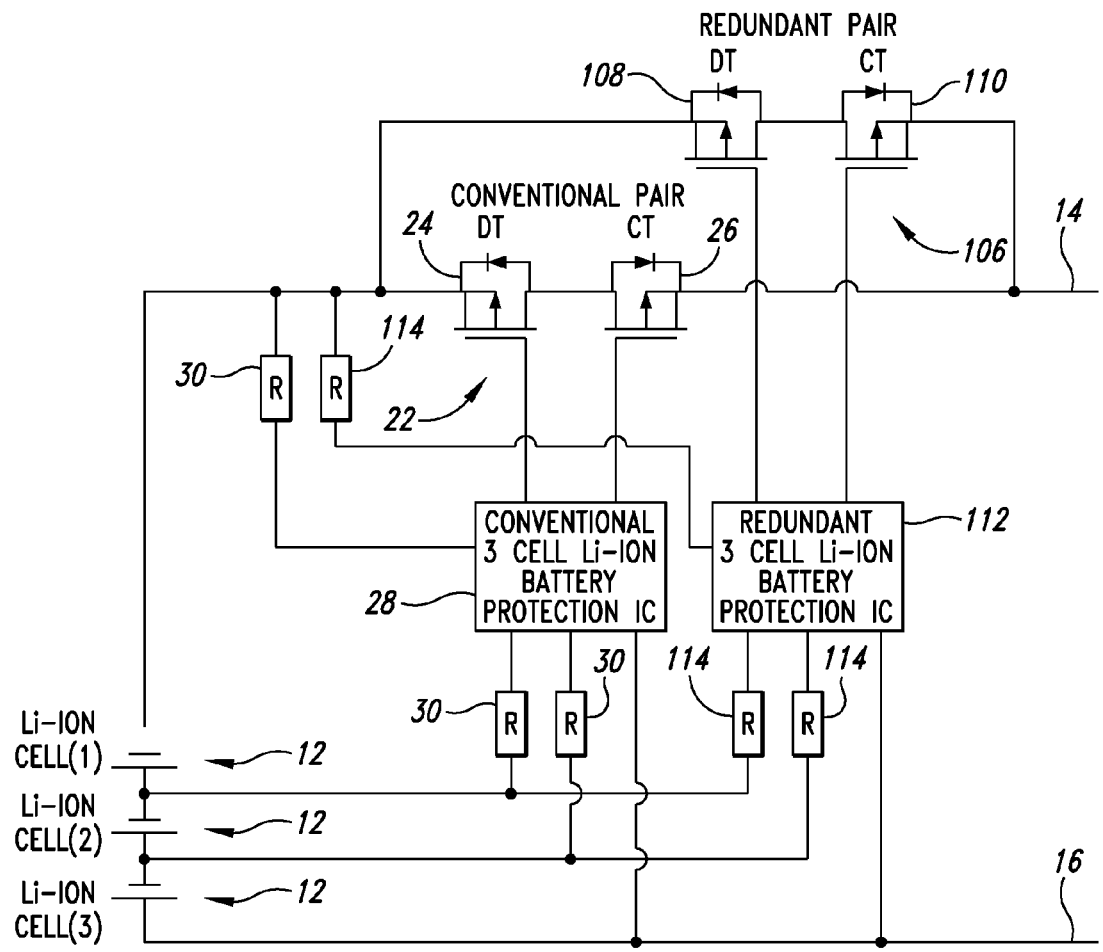
FIG. 4 is a schematic of a three Li ion cell version of the generally depicted enhanced battery pack of FIG. 3 with a three Li ion cell version of the enhanced protection system.

The components of the redundant protection circuit 104 (such as the examples of a redundant protection IC 112 and discrete devices 114 shown in FIG. 4) are either substantially identical to the components of conventional protection circuit 20 regarding component type and circuit location or the components of the redundant protection circuit 104 are at least substantially functionally equivalent to the components of the conventional protection circuit 20. Further shown in FIG. 3 the redundant transistor pair 106 of the discharge transistor 108 and the charge transistor 110 is electrically coupled into the enhanced battery pack 100 in parallel with the conventional transistor pair 22 of the discharge transistor 24 and the charge transistor 26. The redundant protection circuit 104 is electrically coupled to the redundant transistor pair 106 of the discharge transistor 108 and the charge transistor 110. Given the parallel configuration between the conventional transistor pair 22 and the redundant transistor pair 106, if the conventional transistor pair 22 should inadvertently be put in an open circuit condition due to a faulty component of either the conventional transistor pair 22 or the conventional protection circuit 20 without an undesired internal or external condition occurring with the Li ion cells 12 or an externally coupled device (not shown), the redundant transistor pair 106 will still provide a closed circuit condition so that electrical current can flow through the redundant transistor pair 106.

Likewise, if a reverse situation occurs that the redundant transistor pair 106 is in an open circuit condition due to one or more faulty components of the redundant transistor pair 106 and/or the redundant protection circuit 104 without an undesired internal or external condition occurring with the Li ion cells 12 or an externally coupled device (not shown), the conventional transistor pair 22 will still provide a closed circuit condition so that electrical current can flow through the conventional transistor pair 22.

An implementation of the enhanced battery pack 100 is shown in FIG. 4 as having three of the Li ion cells 12. The implementation has a version of the conventional protection system 18 with a version of the conventional protection circuit 18 that has a three-cell version of the conventional protection IC 28 and MOSFET versions of the conventional transistor pair 22 of the discharge transistor 24 and the charge transistor 26. Electrical resistors are used with the version of the conventional protection circuit 18 as the discrete devices 30 to couple the conventional protection IC 28 to circuit locations positioned between pairs of the serially connected Li-ion cells and a circuit location positioned between the number 1 of the Li ion cells 12 and the discharge transistor 24 of the conventional transistor pair 22.

The implementation has a version of the enhanced protection system 102 with a version of the redundant protection circuit 104 that has a three-cell version of the redundant protection IC 112 and MOSFET versions of the redundant transistor pair 106 of the discharge transistor 108 and the charge transistor 110. Electrical resistors are used with the version of the redundant protection circuit 104 as the discrete devices 114 to couple the redundant protection IC 112 to circuit locations between pairs of the Li-ion cells and a location between the number 1 of the Li ion cells 12 and the discharge transistor 24 of the conventional transistor pair 22.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A battery pack comprising:
a first external terminal;
a second external terminal;
a first battery cell electrically coupled with the first external terminal and the second external terminal;
a first electrical switch electrically coupled in series with the first battery cell and the first external terminal;
a first protection circuit electrically coupled to the first battery cell and electrically coupled to the first electrical switch, the first protection circuit having a first state when a first electrical condition of the first battery cell exists and having an absence of the first state when the first condition does not exist, the first electrical switch configured to be in an electrically open circuit state to prevent electrical current from flowing through the first electrical switch when the first state of the first protection circuit exists and to be in an electrically closed circuit state to allow electrical current to flow through the first electrical switch when the first state of the first protection circuit is absent;

a second electrical switch electrically coupled in series with the first battery cell and the first external terminal, the second electrical switch electrically coupled in parallel with the first electrical switch; and a second protection circuit electrically coupled to the first battery cell and electrically coupled to the second electrical switch, the second protection circuit having a first state when the first electrical condition of the first battery cell exists and having an absence of the first state when the first condition does not exist, the second electrical switch configured to be in an electrically open circuit state to prevent electrical current from flowing through the second electrical switch when the first state of the second protection circuit exists and to be in an electrically closed circuit state to allow electrical current to flow through the second electrical switch when the first state of the second protection circuit is absent.

2. The battery pack of claim 1 wherein the first electrical switch is a first pair of transistors.

3. The battery pack of claim 2 wherein the first pair of transistors are MOSFET transistors.

4. The battery pack of claim 1 wherein the first protection circuit has the first state when an overvoltage condition exists with the battery cell.

5. The battery pack of claim 1 further including a plurality of battery cells and wherein the first protection circuit is electrically coupled to the plurality of battery cells, the first protection circuit configured to be in the first state if at least one of the plurality of battery cells is in the first condition.

6. The battery pack of claim 1 wherein the battery cell is a Li ion battery cell.

7. The battery pack of claim 1 further comprising a discrete device electrically coupled between the first protection circuit and the battery cell.

8. The battery pack of claim 1 wherein the discrete device is an electrical resistor.

9. The battery pack of claim 1 wherein the battery cell includes a first terminal and a second terminal and the first protection circuit is coupled to the first terminal and the second terminal of the battery cell.

10. A battery pack comprising:
a first external terminal;
a second external terminal;
a plurality of battery cells electrically coupled to one another and the first external terminal and the second external terminal in series;
a first transistor pair of a charge transistor and a discharge transistor electrically coupled in series with the plurality of battery cells and the first external terminal;
a first integrated circuit electrically coupled to each of the plurality of battery cells, and electrically coupled to the first transistor pair, the first integrated circuit having a first state when a first electrical condition of at least one of the plurality of battery cells exists and having an absence of the first state when the first condition does not exist, the first transistor pair configured to be in an electrically open circuit state to have an absence of electrical continuity between the first external terminal and the plurality of battery cells when the first state of the first integrated circuit exists and to be in an electrically closed circuit state to have electrical continuity between the first external terminal and the plurality of battery cells when the first state of the first integrated circuit is absent;

a second transistor pair of a charge transistor and a discharge transistor electrically coupled in series with the plurality of battery cells and the first external terminal, the second transistor pair electrically coupled in parallel with the first transistor pair;

a second integrated circuit electrically coupled to each of the plurality of battery cells, and electrically coupled to the second transistor pair, the second integrated circuit having a first state when the first electrical condition of at least one of the plurality of battery cells exists and having an absence of the first state when the first condition does not exist, the second transistor pair configured to be in an electrically open circuit state to have an absence of electrical continuity between the first external terminal and the plurality of battery cells when the first state of the second integrated circuit exists and to be in an electrically closed circuit state to have electrical continuity between the first external terminal and the plurality of battery cells when the first state of the second integrated circuit is absent.

11. The battery pack of claim 10 wherein the first transistor pair are MOSFET transistors.

12. The battery pack of claim 10 wherein the first integrated circuit has the first state when an overvoltage condition exists with at least one of the plurality of the battery cells.

13. The battery pack of claim 10 wherein the plurality of the battery cells are Li ion battery cells.

14. The battery pack of claim 10 further comprising a discrete device electrically coupled between the first integrated circuit and one of the plurality of the battery cells.

15. The battery pack of claim 14 wherein the discrete device is an electrical resistor.

16. The battery pack of claim 10 wherein each of the plurality of the battery cells includes a first terminal and a second terminal and the first integrated circuit is coupled to the first terminal and the second terminal of each of the plurality of the battery cells.

17. An apparatus comprising:
a first terminal;
a second terminal;
a battery cell electrically coupled to the first and second terminals;
a first electrical switch electrically coupled in series with the battery cell and the first terminal;
a first protection circuit electrically coupled to the battery cell and the first electrical switch, the first protection circuit having a state, the first electrical switch configured to be in an electrically open circuit state to prevent electrical current from flowing through the first electrical switch when the state of the first protection circuit exists and to be in an electrically closed circuit state to allow electrical current to flow through the first electrical switch when the state of the first protection circuit is absent;
a second electrical switch electrically coupled in series with the battery cell and the first terminal, the second electrical switch electrically coupled in parallel with the first electrical switch; and
a second protection circuit electrically coupled to the battery cell and the second electrical switch, the second protection circuit having a state, the second electrical switch configured to be in an electrically open circuit state to prevent electrical current from flowing through the second electrical switch when the state of the second protection circuit exists and to be in an electrically closed circuit state to allow electrical current to flow through the second electrical switch when the state of the second protection circuit is absent.

18. The apparatus of claim 17 wherein the battery cell is a first battery cell, and wherein the apparatus further comprises a second battery cell electrically coupled to the first and second terminals.

19. The apparatus of claim 17 wherein the first protection circuit has the state when an electrical condition of the battery cell exists and wherein the state of the first protection circuit is absent when the electrical condition of the battery cell does not exist.

20. The apparatus of claim 17 wherein the first protection circuit has the state when a device to which the apparatus is electrically coupled has an undesirable condition.

* * * * *